April 9, 1946.  A. P. McKAY  2,398,147
AGRICULTURAL IMPLEMENT
Filed May 26, 1941  3 Sheets-Sheet 1

INVENTOR.
Augusta P. McKay
BY Lancaster, Allwine & Rommel
ATTORNEYS.

April 9, 1946.　　　A. P. McKAY　　　2,398,147
AGRICULTURAL IMPLEMENT
Filed May 26, 1941　　　3 Sheets-Sheet 2

INVENTOR.
Augusta P. McKay
BY Lancaster, Allwine & Rommel
ATTORNEYS.

April 9, 1946.　　　　A. P. McKAY　　　　2,398,147
AGRICULTURAL IMPLEMENT
Filed May 26, 1941　　　　3 Sheets-Sheet 3
FIG. 7.
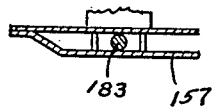
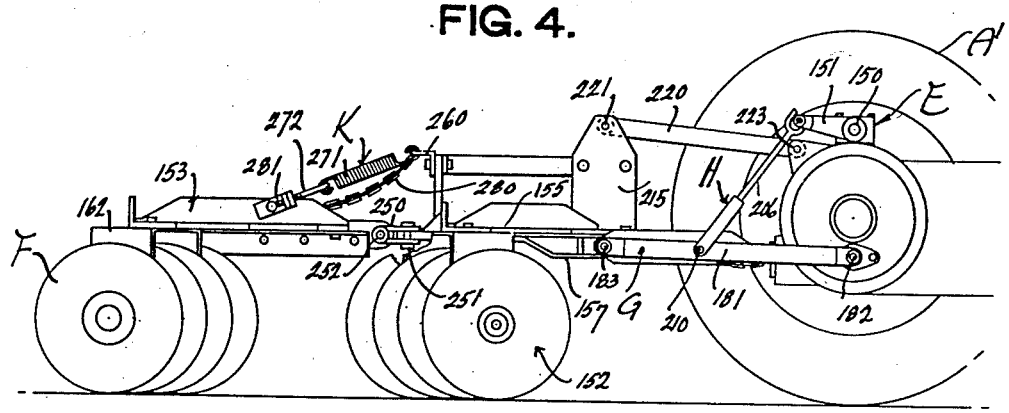
FIG. 4.
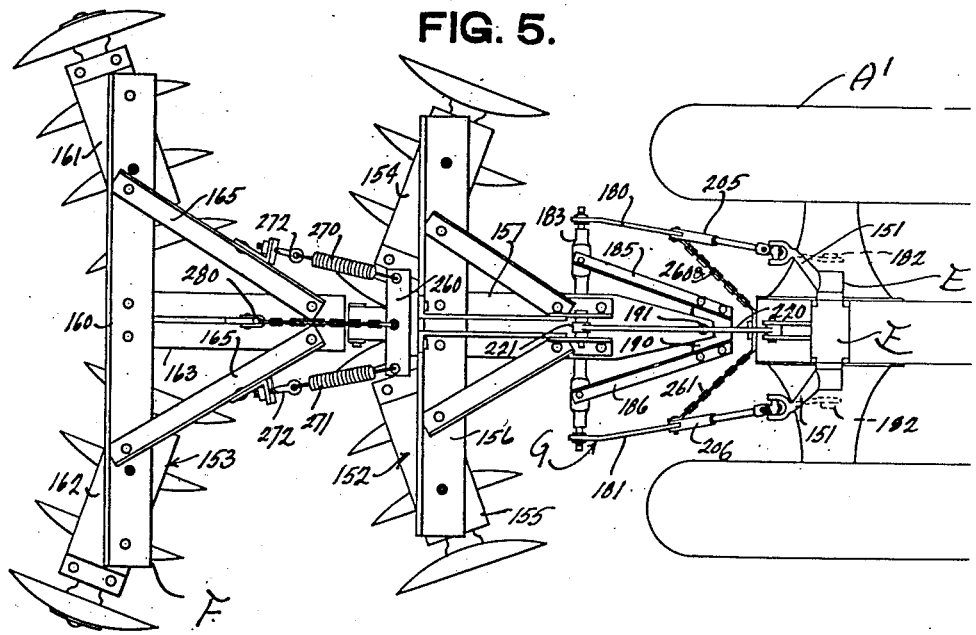
FIG. 5.
INVENTOR.
Augusta P. McKay
BY Lancaster, Allwine & Rommel
ATTORNEYS.

Patented Apr. 9, 1946

2,398,147

UNITED STATES PATENT OFFICE 2,398,147

AGRICULTURAL IMPLEMENT

Augusta Postelle McKay, Cedartown, Ga., assignor to Rome Plow Company, Cedartown, Ga., a corporation Application May 26, 1941, Serial No. 395,258

5 Claims. (Cl. 97—50)

This invention relates to improvements in means for connecting and operating agricultural implements and the like in connection with tractors.

The primary object of this invention is the provision of means for connecting an agricultural implement (such as a harrow) to a tractor, so that normally it will operate flexibly and freely upon the ground or material for which it is intended, in an efficient manner; improved lifting mechanism being associated with the tractor and implement to enable the latter to be entirely suspended, as will be desirable under some circumstances, such as when it is desired to transport the implement, or to make a short turn of the tractor.

A further object of this invention is the provision of improved means for bodily lifting and suspending a tractor drawn implement by means of a power take off from the tractor.

A further object of this invention is the provision of improved means to lift a double section implement bodily by means of a power take off from a tractor.

A further object of this invention is the provision of an improved implement lifting mechanism for tractors and like vehicles.

Other objects and advantages of this invention will be apparent during the course of the following detailed description.

In the accompanying drawings, forming a part of this specification, and wherein similar reference characters designate corresponding parts throughout the several views, Figure 1 is a side elevation of an agricultural implement, such as a two section harrow, flexibly and operatively connected to the rear end of a heavy duty tractor; the implement and the tractor having improved lift means associated therewith. This view shows the implement in a flexible ground operating position.

Figure 4 is a side elevation of an implement, such as a suspension disc harrow operatively connected with another type of draft and lifting mechanism of a lighter duty type tractor than that shown in Figure 1. This implement has been made the subject-matter of a co-pending application, now Reissued Patent 22,627, dated April 3, 1945.

Figure 5 is a plan view of the details shown in Figure 4.

Figure 7 is a cross sectional view showing the association of the draw bar of the agricultural implement with a cross bar of the draft mechanism.

Figure 1:
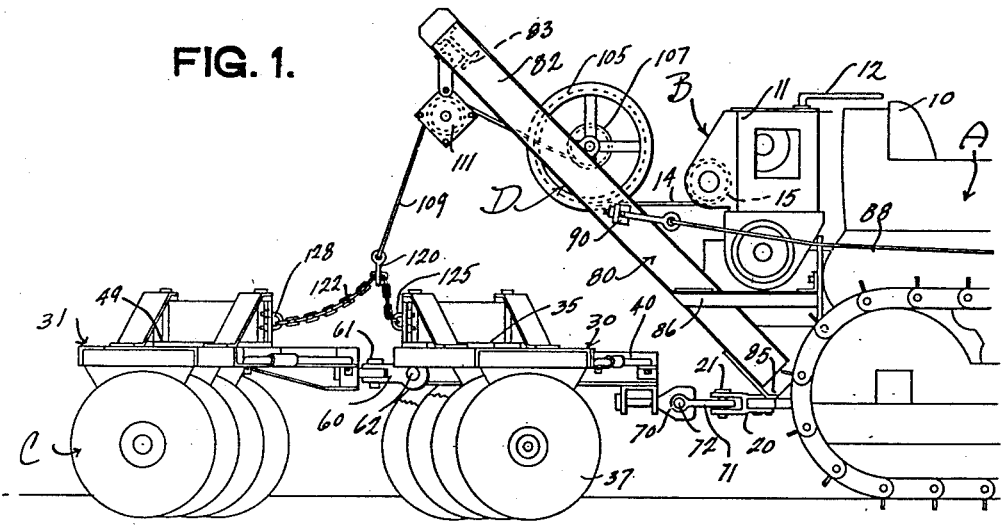

In the drawings, wherein for the purpose of illustration are shown different forms of the invention, the letter A may generally designate a heavy duty type of tractor, such as shown in Figure 1, with which is associated a power take off mechanism, generally referred to as a cable control unit B. The agricultural implement C may be of any approved type. Improved lifting mechanism D is associated with the cable control unit B and the implement C for lifting or suspending the latter to an inoperative relation above ground.

Figure 6:
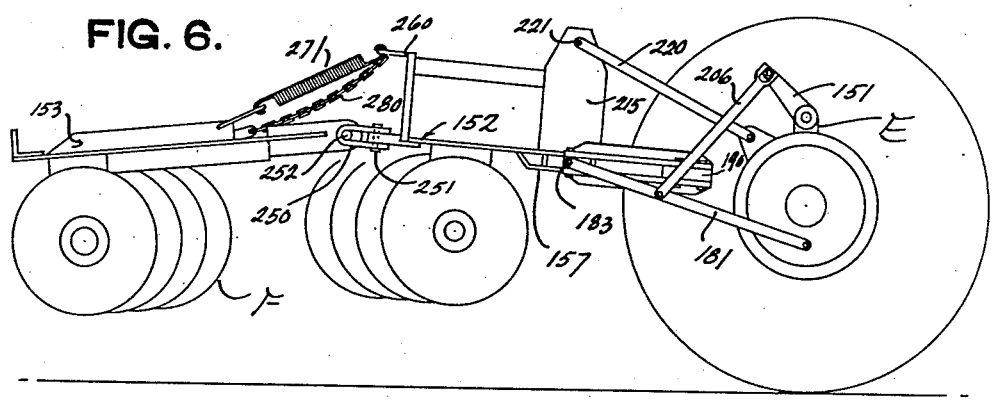
Figure 6 is a view similar to Figure 4, but with the power take off and lift mechanism of the tractor operatively supporting the implement above a ground surface.

In the form of invention shown in Figures 4 to 6 inclusive, the tractor $A^1$ is of a lighter duty type than that shown in Figure 1, although not necessarily so. It has associated therewith a power take off mechanism E. The implement F may be of the double cutting disc harrow type and with it is associated improved draw bar or draft connecting means G for connecting the same to the tractor. An improved lifting mechanism H is associated with the power take off of the tractor $A^1$ for lifting the implement F to a suspended position. Improved means K is provided between the two sections of the harrow or implement F for cooperatively connecting the same for suspension purposes.

Figure 2:
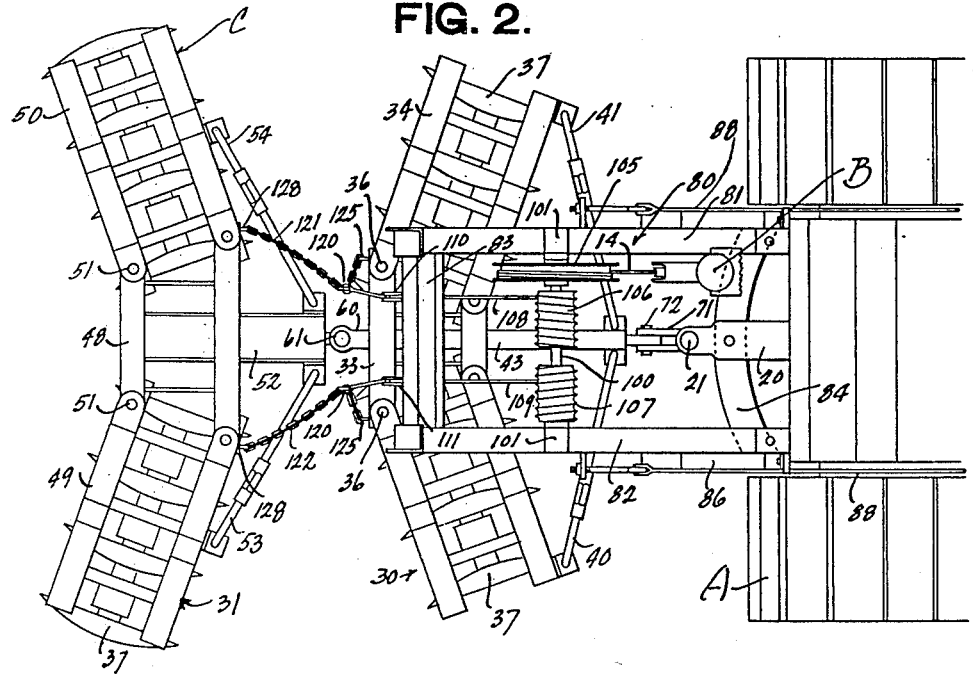
Figure 2 is a plan view of the details shown in Figure 1.
Figure 3:
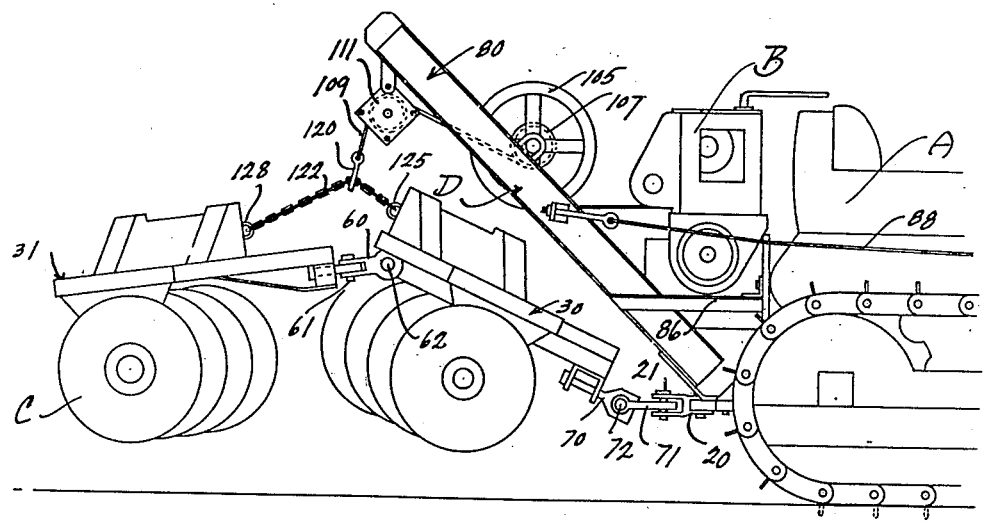
Figure 3 is a side elevation similar to Figure 1, but with the lift mechanism operatively suspending the implement above the ground.

Referring to the form of invention shown in Figures 1, 2 and 3 of the drawings, the tractor is of the heavy duty type, employing an endless tread; the same along the central axis at the rear thereof has a seat 10. Rearwardly of the seat this type of tractor, manufactured by the Caterpillar Tractor Company, Peoria, Illinois, is provided with a power take off mechanism generally referred to as a cable control. This cable control designated at B in Figures 1, 2 and 3 of the drawings embodies a casing 11 having therein a suitable drive mechanism operated by a clutch through a control lever 12. The cable 14 is trained around a series of pulleys 15 as is well known to those skilled in this art. At its rear end below the power take off mechanism the tractor is provided with a draw bar 20. It has a vertically disposed coupling pin 21 to which the implement to be drawn by the tractor may be connected.

While it is to be distinctly understood that the improved lifting means herein described may be associated with any type of implement, I have shown a double section cutting disc harrow C. This type of harrow includes a front section 30 and a rear section 31. The front section 30 includes a frame 33 having disc gang carriers 34 and 35 at each side thereof, which are connected as at 36 to the frame 33. The gang carriers 34 and 35 of course, have discs 37 suitably suspended therefrom in approved manner. The gangs 34 and 35 are suitably connected by adjustable brace bars 40 and 41 with the forward end of a draw bar 43 which extends longitudinally of the section 30, as shown in Figure 2 of the drawings. This locates the gangs 34 and 35 in divergent forwardly extending relation.

The rear section 31 includes the frame work 48 to which the disc gang carriers 49 and 50 are connected at 51. The section 31 is provided with an axially extending draw bar 52. Brace bars 53 and 54 are connected at the forward end of the draw bar 52 and to the intermediate portions of the gangs 49 and 50 in order to support the disc carriers 49 and 50 in a rearward divergent relation.

The draw bar 52 at its forward end has a coupling 60 connected with the rear end of the draw bar 43 of the forward section 30. This connection provides a vertical pivot 61 and a horizontal pivot 62, so as to permit the rear section 31 to tilt laterally and move vertically with respect to the forward section.

A draw bar coupling 70 is provided for the front end of a draw bar 43. It has a clevis 71 with a horizontal pivot or axial connection 72. A bolt 21 of the tractor draw bar 20 provides pivotal action of the implement C on a vertical axis.

Referring to the improved lifting mechanism D the same includes a rigidly positioned frame 80 mounted upon the rear end of the tractor. It is rectangular in form and positioned at an angle of approximately 45° to the horizontal. This frame 80 includes side members 81 and 82, a top cross member 83 and a lower arcuated cross member 84. The side rails 81 and 82 are connected at their lower ends by means of a construction 85 to the lower frame work of the tractor. Above this point the sides 81 and 82 are connected by horizontal angle pieces 86 to the tractor frame, for the purpose of bracing the frame 80 in position. Still another brace is provided by means of cables 88 which are connected to the side pieces of the frame 80, as at 90, the cables extending for connection to some portion of the frame work of the tractor adjacent the front of the tractor (not shown).

The frame 80 is provided with a drum supporting shaft 100 at a point near the front end of the frame. This shaft 100 is rotatably supported by suitable bearings 101 upon the side rails 81 and 82. It is of polygonal cross section between the side pieces of the frame and adapted to receive thereon, with a splined type of connection, a large drum or wheel 105 upon which the other end of the power lift cable 14 is trained and connected therewith. Suitable cable drums 106 and 107 also have a splined connection upon this shaft 100. They respectively have trained thereon steel cables 108 and 109, and are provided with spiral grooves for the purpose of orderly training of the cables thereupon.

The cross bar 83 of the frame 80 is provided with suitable sheave blocks 110 and 111, which are preferably turnable and receive the cables 108 and 109 in trained relation thereupon. These cables below the sheave blocks are provided with suitable hooks or couplings 120 adapted for connection with chains or flexible cables 121 and 122 respectively.

The chains 121 and 122 connect the front and rear sections of the implement C. Normally they are slack; the front connections of these chains 121 and 122, designated at 125 in the drawings, being equidistant at each side of the longitudinal axis of the section 30, and the rear ends of these chains being connected at 128 to section 31 equidistant from the longitudinal axis of the implement C. The connections 128 are spaced farther apart than the connections 125, so that the chains 121 and 122 are really rearwardly divergent with respect to each other.

The normal operating position of the implement C with respect to tractor A is shown in Figure 1. In this position the chains 121 and 122 are slack and the sections 30 and 31 of the implement may follow the contour of the ground. The sections may tilt laterally with respect to each other and with respect to the draft connection with the tractor, and they may be tilted on a transverse axis with respect to each other and with respect to the tractor in a manner which will be understood by those skilled in the art to which this invention relates.

When it is desired to lift the implement C off of the ground, and to suspend the same, for any reason, such as to transport the implement or to turn the tractor around, the operator of the tractor merely presses the lever 12. This operates the clutch of the cable control unit 11 and causes the cable 14 to wind upon the drum in this unit. The cable thus unwinds from the large cable drum 105. This will cause the worm-like cable drums 106 and 107 to wind the cables 108 and 109 thereupon; pulling the connecting chains 121 and 122 taut. Both sections of the implement C will be lifted, and inasmuch as these chains have their connections upon the implement sections in spaced relation from the longitudinal center of the implement the front section of the implement will cause the rear section 31 of the implement to swing into axial alignment longitudinally with the tractor, and with the front section. Of course, the cables 108 and 109 leading to the feed blocks bring the front section into longitudinal alignment with the axis of the tractor regardless of the position which the two sections of the implement have with respect to each other and the tractor. In this connection the downward divergence of the cables 108 and 109 from the sheave blocks 110 and 111 to their points of connection with the chains 121 and 122 have an important bearing, and also the fact that the chains 121 and 122 have their front connections spaced closer together than the rear connections upon the front and rear sections respectively of the implement.

It was heretofore mentioned that the shaft 100 upon which the drums 105, 106 and 107 are mounted is of polygonal cross section, in order to mount the drums upon the same with a splined connection. This arrangement is provided for the reason that some tractors are provided with right hand cable control units and others have left handed cable control units. Still other tractors have a cable extending along the longitudinal center of the tractor. Drums 105, 106 and 107 may thus be arranged upon the shaft 100 to suit the position of the cable control unit.

Referring to Figure 3 of the drawings, which shows the implement C suspended from the ground, it will be noted that the chains 121 and 122 are attached to the front and rear sections of the implement at points considerably higher than the connecting coupling 60. When the implement is lifted, the front section tilts upwardly rearwardly from its draw bar connection with the tractor. This is reverse to the way the rear section elevates. This causes the connecting chains to be drawn taut and the discs on the two sections to be lifted off of the ground in substantially a horizontal plane.

Referring to the modified form of lift mechanism as shown in Figures 4, 5 and 6 of the drawings, the tractor A is preferably of a lighter duty type than that shown in Figure 1, but not necessarily so. The power take off E is provided with a shaft 150 having lift arms 151 of well known construction.

The implement F includes front and rear sections 152 and 153. The front section 152 is provided with disc supporting gangs 154 and 155 mounted upon a suitable frame 156. This front section also includes a central longitudinally extending draw bar 157 which at its fore portion is divided into upper and lower plates, as shown in Figure 4. The draw bar 157 is relatively broad for a purpose to be subsequently described.

The rear section 153 includes a frame or beam 160 having disc supporting gangs 161 and 162. The rear section also has a longitudinally extending draw bar 163; the forward end of which is connected by means of angle braces 165 with the frame or beam 160. These angle braces extend rearwardly in divergent relation.

Referring to the improved draft connection G I provide draw bars 180 and 181 pivotally connected at points 182 at their forward ends to the axle housing of the tractor. They extend rearwardly, slightly divergent with respect to each other, and at their rear ends are provided with a cross bar 183. This cross bar 183 between the points of connections of the draw bars 180 and 181 is provided with rigidly attached angle pieces 185 and 186, in pairs, which extend convergently forward. At their front ends they rigidly support a pull plate 190. This pull plate 190 receives a vertically disposed coupling pin 191 to which the front end of the draw bar 157 of the implement F is pivotally attached. As before mentioned the front end of the coupling 157 is constructed of upper and lower plate sections. The cross bar 183 is disposed between these sections in a transverse sliding but otherwise snug nontilting relation.

The lever arms 151 of the power take off E are provided with longitudinally adjustable lift bars 205 and 206; the same having a universal pivot connection with the levers 151 and at their lower ends being pivotally connected as at 210 with the draw bars 180 and 181, intermediate the ends of the latter. It will be understood that raising of the levers 151 pulls the draw bars 180 and 181 upwardly and lifts the implement F in a manner to be subsequently detailed.

The front section 152 of the implement F is provided with an upstanding member or standard 215, at the front end thereof, immediately above the cross bar 183, to which is pivotally connected a brace bar or member 220, at 221. The bar 220 is connected at 223 with the rear end of the tractor frame. These connections 221 and 223 are above the draw bars 180 and 181 so that the front section of the harrow or implement F will be lifted in a horizontal plane when the lift mechanism is operated.

Referring to the connections of the front and rear sections of the implement F, a coupling 250 is provided which has a vertical pivot axis connection at 251 with the rear end of the draw bar of the front section 152 and a horizontal axis connection at 252 with the front end of the draw bar of the rear section.

The means K includes a cross piece 260 upon the frame of the front section 152 at a location higher than any point of the rear section frame work, and at each side of the longitudinal central axis of the implement springs 270 and 271 are connected with this cross piece 260. By means of adjustable bolts 272 these springs 270 and 271 are connected with the angle braces 165 at each side of the longitudinal axis of the implement. The springs 270 and 271 diverge rearwardly for the purpose of insuring proper alignment of the rear section as it is lifted into suspended position. I prefer also to provide a normally slack chain 280, located along the longitudinal center of the implement, connected at one end to the bar 260 and at the other end to a point 281 upon the frame work of the rear section. This chain is very slack during operation of the implement and even when the implement is in suspended position. It only operates to prevent excessive vibration of the rear section and prevent rupture of the springs 270 and 271 should the strain upon the springs be too great because of passing of the tractor over irregular ground surfaces, etc.

The operation of the implement as it is drawn by the tractor will be apparent from the foregoing. The two sections of the implement F are entirely flexible and may move bodily upwardly or downwardly with respect to each other and tilt angularly with respect to each other, due to the universal type of coupling connection between them. The entire implement and especially the front section may pivotally move upwardly, downwardly and sideways with respect to the tractor.

As the lifting arms 151 pull the draw bars 180 and 181 upwardly it can readily be understood that this will lift the cross bar 183, and due to the brace bar 220 above described, the front section will be lifted in substantially a horizontal position. It will not tilt sidewise due to the close fitting connection of the upper and lower portions of the draw bar 157 upon the cross bar 183. In this connection note that the draw bar 157 is very wide and will prevent this tilting of the front section.

Flexible brace chains 260a and 261 may be connected to the rear end of the tractor frame and to the intermediate portions of the draw bars 180 and 181, as shown in Figure 5 of the drawings.

From the foregoing description of the invention it will be noted that an efficient type of draft connection has been provided for an agricultural or other implement to be drawn by the tractor which will enable the implement to operate with all of its flexibility and efficiency under normal circumstances. In addition I have provided a lift mechanism which will enable the implement to be lifted or suspended clear of the ground, and to hold it in properly positioned and aligned relation. I am well aware that it has heretofore been proposed to lift implements at the rear of tractors by means of a variety of mechanisms, but none of them, so far as I am aware, will permit of the efficient and flexible operation of the implement, particularly such as are complicated, and still enable the same to be lifted and automatically swung into properly supported and aligned relation. The improved lift mechanism is particularly adaptable for use with multiple section disc harrows, since they are being more extensively used every day in cultivation and reclamation work, as well as in use of construction and highway projects.

Various changes in the shape, size and arrangement of parts may be made to the forms of invention herein shown and described, without departing from the spirit of the invention or the scope of the claims.

I claim:

1. In combination a tractor, an agricultural implement comprising front and rear sections flexibly connected together, a pair of flexible members connecting said sections together at each side of the longitudinal axis of the implement and normally slack under all operating conditions of the implement, and a power take off upon the tractor having means for connection with said flexible members in order to lift said sections and suspend the implement from the tractor.

2. In an agricultural implement the combination of a front section comprising frames divergently arranged with respect to each other in a forward direction and each frame having a plurality of harrow discs thereon, a rear section comprising a pair of frames divergently arranged with respect to each other rearwardly and each frame having a plurality of harrow discs thereon, and means connecting said sections together with a draft connection which will permit of said sections moving vertically in angular relation to each other on a horizontal pivot and laterally in relation to each other upon a vertical pivot.

3. In combination a tractor, a front section comprising frames divergently arranged with respect to each other in a forward direction and each frame having a plurality of harrow discs thereon, a rear section comprising a pair of frames divergently arranged with respect to each other rearwardly and each frame having a plurality of harrow discs thereon, means connecting said sections together with a draft connection which will permit of said sections moving vertically in angular relation to each other on a horizontal pivot and laterally in relation to each other upon a vertical pivot, means connecting said sections so that the degree of relative movement between said sections upon the horizontal pivot axis is limited, and lift means upon said tractor for elevating both of said sections with respect to said tractor.

4. In combination a tractor, a front section comprising frames divergently arranged with respect to each other in a forward direction and each frame having a plurality of harrow discs thereon, a rear section comprising a pair of frames divergently arranged with respect to each other rearwardly and each frame having a plurality of harrow discs thereon, means flexibly connecting said sections together with a draft connection which will permit of said sections moving vertically in angular relation to each other on a horizontal pivot and laterally in relation to each other upon a vertical pivot, means connecting said sections so that the degree of relative movement between said sections upon a horizontal pivot axis is limited, lift mechanism upon said tractor for elevating both of said sections with respect to said tractor, said lift mechanism having connection directly with said flexible means which connects said sections together for said limited movement angularly on a horizontal pivot axis.

5. In combination a tractor having a power take-off, an earth working implement comprising a pair of flexibly connected sections, each section comprising a plurality of transversely arranged earth working members, and normally slack flexible means connected between said sections and connected to the power take-off whereby therethru the entire implement may be lifted off the earth's surface.

AUGUSTA POSTELLE McKAY.